(12) United States Patent
Novak

(10) Patent No.: US 7,636,728 B2
(45) Date of Patent: Dec. 22, 2009

(54) MEDIA DIFFERENCE FILES FOR COMPRESSED CATALOG FILES

(75) Inventor: Michael J. Novak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 74 days.

(21) Appl. No.: 11/425,835

(22) Filed: Jun. 22, 2006

(65) Prior Publication Data

US 2007/0299886 A1 Dec. 27, 2007

(51) Int. Cl.
*G06F 7/00* (2006.01)
(52) U.S. Cl. ..................................................... 707/101
(58) Field of Classification Search .................. 707/101
See application file for complete search history.

(56) References Cited

U.S. PATENT DOCUMENTS

| | | | |
|---|---|---|---|
| 5,265,248 A | 11/1993 | Moulios et al. | |
| 5,355,302 A | 10/1994 | Martin | |
| 5,890,175 A | 3/1999 | Wong et al. | |
| 6,032,130 A | 2/2000 | Alloul et al. | |
| 6,163,811 A | 12/2000 | Porter | |
| 6,248,946 B1 | 6/2001 | Dwek | |
| 6,351,596 B1 | 2/2002 | Ostrover | |
| 6,353,878 B1 * | 3/2002 | Dunham | 711/162 |
| 6,374,250 B2 | 4/2002 | Ajtai et al. | |
| 6,662,231 B1 | 12/2003 | Drosset et al. | |
| 6,737,994 B2 | 5/2004 | Davis et al. | |
| 6,804,733 B1 | 10/2004 | Michel et al. | |
| 6,877,134 B1 | 4/2005 | Fuller et al. | |
| 6,952,823 B2 | 10/2005 | Kryloff et al. | |
| 2002/0138593 A1 | 9/2002 | Novak et al. | |
| 2003/0009469 A1 | 1/2003 | Platt et al. | |
| 2004/0006606 A1 | 1/2004 | Marotta et al. | |
| 2004/0230659 A1 * | 11/2004 | Chase | 709/206 |
| 2005/0021478 A1 | 1/2005 | Gautier et al. | |
| 2005/0114614 A1 * | 5/2005 | Anderson et al. | 711/162 |

(Continued)

OTHER PUBLICATIONS

Author Unknown, WhereIsIt?—Product Information, Printed Apr. 10, 2006, 4 pages, http://www.whereisit-soft.com/product.html, USA.

Author Unknown, Xdelta—1.1.3 README, Xdelta—A binary delta generator, printed Apr. 10, 2006, 4 pages, http://hpux.cs.utah.edu/hppd/hpux/Users/xdelta-1.1.3/readme.html, USA.

(Continued)

*Primary Examiner*—Charles Rones
*Assistant Examiner*—Fazlul Quader
(74) *Attorney, Agent, or Firm*—Senniger Powers LLP

(57) ABSTRACT

Generating a difference (DIFF) file for catalog files. A second catalog file is compared with a first catalog file to identify at least a modified portion in the second catalog file. The modified portion indicates a difference between the content of the first catalog file and the second catalog file. A location of the modified portion is identified in the content of the second catalog file. A reference marker is assigned to the identified location with respect to the second catalog file. The DIFF file is generated indicating the modified portion and indicating the reference marker.

19 Claims, 9 Drawing Sheets

U.S. PATENT DOCUMENTS

| | | |
|---|---|---|
| 2005/0132382 A1 | 6/2005 | McGuire et al. |
| 2005/0154759 A1 | 7/2005 | Hofmeister et al. |
| 2005/0177624 A1* | 8/2005 | Oswald et al. .............. 709/219 |
| 2005/0193094 A1 | 9/2005 | Robbin et al. |
| 2005/0197906 A1 | 9/2005 | Kindig et al. |
| 2006/0242106 A1 | 10/2006 | Bank |

OTHER PUBLICATIONS

Burns, Randal C., et al., A Linear Time, Constant Space Differencing Algorithm, Feb. 5, 1997, 8 pages, http://www.almaden.ibm.com/projects/data/storagessystems/ipccc97.pdf, Department of Computer Science, University of California Santa Cruz, Santa Cruz, CA, USA.

* cited by examiner

FIG. 2

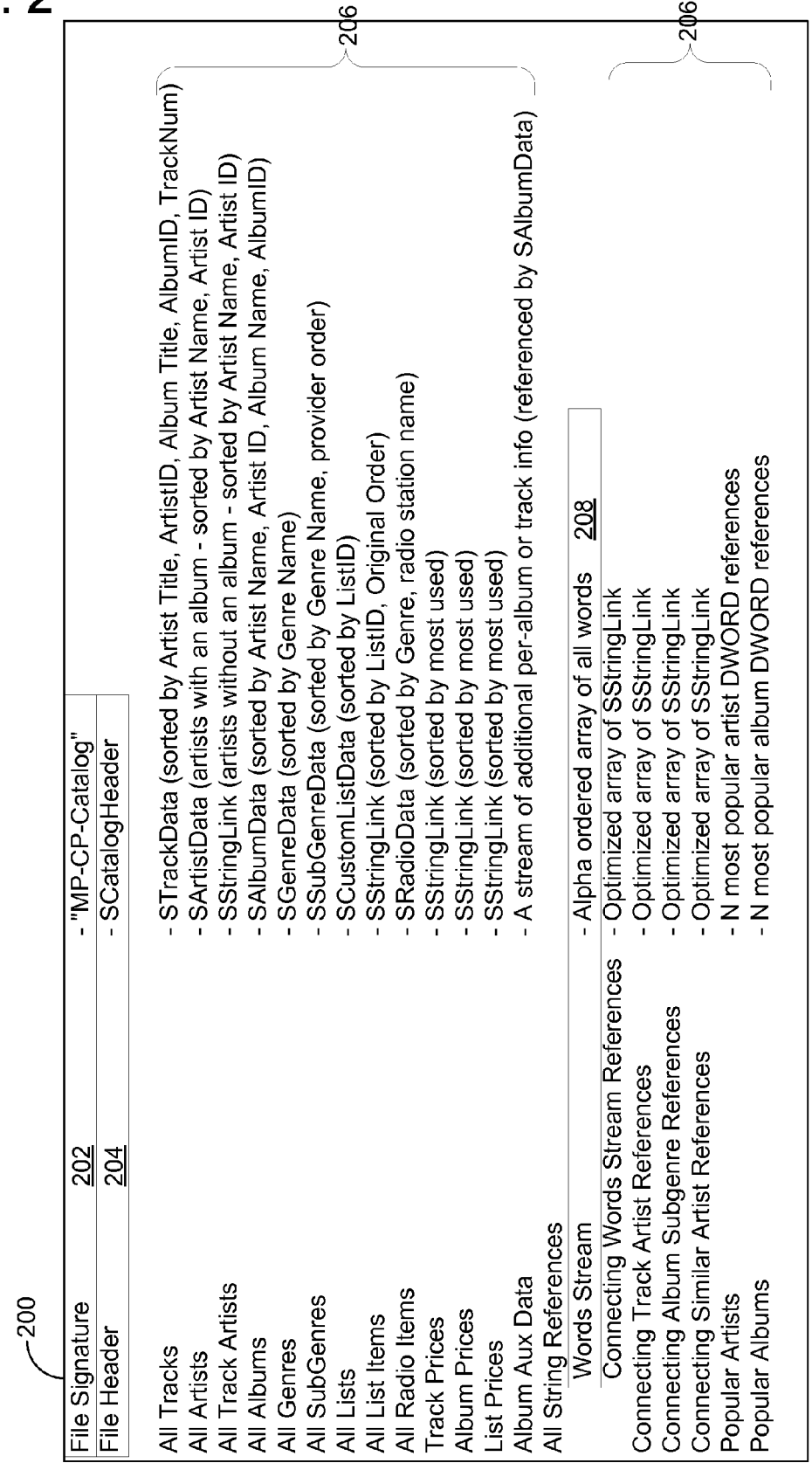

| File Signature | 202 | - "MP-CP-Catalog" |
|---|---|---|
| File Header | 204 | - SCatalogHeader |

| | |
|---|---|
| All Tracks | - STrackData (sorted by Artist Title, ArtistID, Album Title, AlbumID, TrackNum) |
| All Artists | - SArtistData (artists with an album - sorted by Artist Name, Artist ID) |
| All Track Artists | - SStringLink (artists without an album - sorted by Artist Name, Artist ID) |
| All Albums | - SAlbumData (sorted by Artist Name, Artist ID, Album Name, AlbumID) |
| All Genres | - SGenreData (sorted by Genre Name) |
| All SubGenres | - SSubGenreData (sorted by Genre Name, provider order) |
| All Lists | - SCustomListData (sorted by ListID) |
| All List Items | - SStringLink (sorted by ListID, Original Order) |
| All Radio Items | - SRadioData (sorted by Genre, radio station name) |
| Track Prices | - SStringLink (sorted by most used) |
| Album Prices | - SStringLink (sorted by most used) |
| List Prices | - SStringLink (sorted by most used) |
| Album Aux Data | - A stream of additional per-album or track info (referenced by SAlbumData) |
| All String References | |
|   Words Stream | - Alpha ordered array of all words  208 |
|   Connecting Words Stream References | - Optimized array of SStringLink |
|   Connecting Track Artist References | - Optimized array of SStringLink |
|   Connecting Album Subgenre References | - Optimized array of SStringLink |
|   Connecting Similar Artist References | - Optimized array of SStringLink |
|   Popular Artists | - N most popular artist DWORD references |
|   Popular Albums | - N most popular album DWORD references |

FIG. 3B

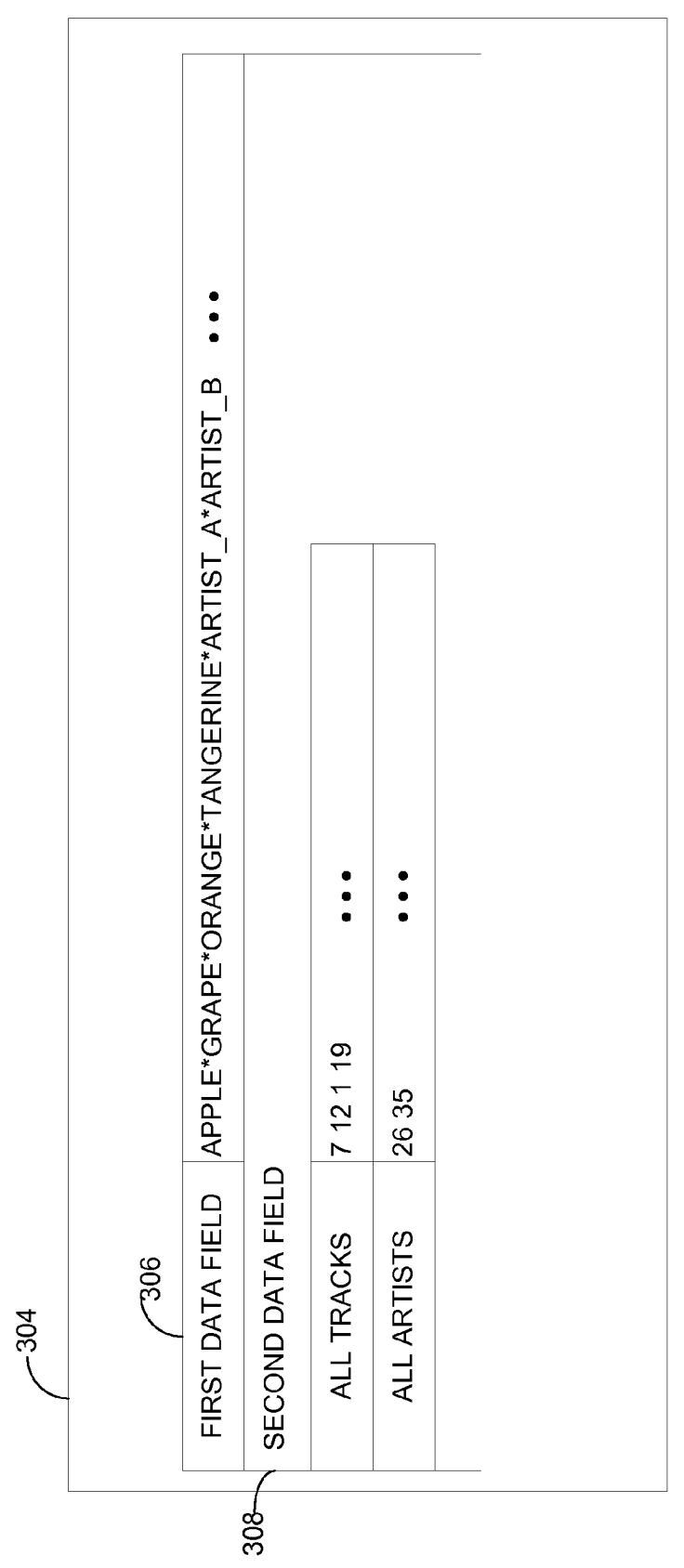

| FIRST DATA FIELD | APPLE*GRAPE*ORANGE*TANGERINE*ARTIST_A*ARTIST_B ... |
|---|---|
| SECOND DATA FIELD | |
| ALL TRACKS | 7 12 1 19 ... |
| ALL ARTISTS | 26 35 ... |

```
STRUCT SDIFFMOVE
{
    DWORD   DWPOSITION;
    LONG    NOFFSET;
};
```

```
                                    ┌─418
┌─────────────────────────────────────┴────────┐
│ STRUCT SDIFFMOVE                             │
│ {                                            │
│    DWPOSITION    = 6                         │
│    NOFFSET       = 7                         │
│ };                                           │
└──────────────────────────────────────────────┘
```

MEDIA DIFFERENCE FILES FOR COMPRESSED CATALOG FILES

BACKGROUND

Advances in digital media technology and creative business models have made enjoyment of digital media more convenient. Consumers not only have media hardware (e.g., a compact disk (CD) read-write device) to burn media files onto a CD-ROM, but may also transfer the digital media files to their portable devices (e.g., a MP3 player). In addition, consumers may purchase digital media content over the Internet via their desktop computers, cellular phones, or portal devices.

In purchasing online digital media content, some existing practices require that the consumers visit one or more online media (e.g., audio or video) web sites before the consumers can download the purchased media files. Others methods of online media sale include purchasing media content via a media player. For example, the media player may include a link within its graphical user interface (GUI) to guide the consumers to an online media content vendor or media service. The consumer may next proceed to order media content from the vendor.

In order to provide the consumers with a vast selection of media collections, the vendors typically provide a database storing a list of its offerings. The vendor would next present a listing of the collection of the media content and allow the consumers to perform queries to purchase a desired selection. The vendor would continuously update the database by adding (e.g., new album release) or removing (e.g., due to expired license of a particular media content) media files from the database. While such constant update ensures the consumers receive the latest media offerings, the customers frequently experience long delays in searching the vast database for desirable media file. For customers with relatively slow connection to the Internet, such long delays inevitably hinder the customers' user experience.

SUMMARY

Embodiments of the invention overcome the shortcomings of existing practice by transmitting a highly compressed media catalog file to the consumer's local client device for a fast and efficient searching and querying of the vendor's media offerings. In addition, aspects of the invention also include periodically updating the highly compressed media catalog file by transferring a compressed difference (DIFF) file such that the consumers are ensured to have the most up-to-date listing of the media collections available.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 2 is a block diagram illustrating a description of a structure of a highly compressed media catalog file according to an embodiment of the invention.

FIG. 3B is a diagram of a simplified example of a highly compressed media catalog file based on the collection in FIG. 3A according to an embodiment of the invention.

FIG. 4A is a diagram illustrating a data structure of a difference (DIFF) file representing an update to the catalog file according to an embodiment of the invention.

FIG. 4D is a diagram of a DIFF file showing the difference between a first catalog file in FIG. 3A and a second catalog file in FIG. 4B according to an embodiment of the invention.

Figure 1:
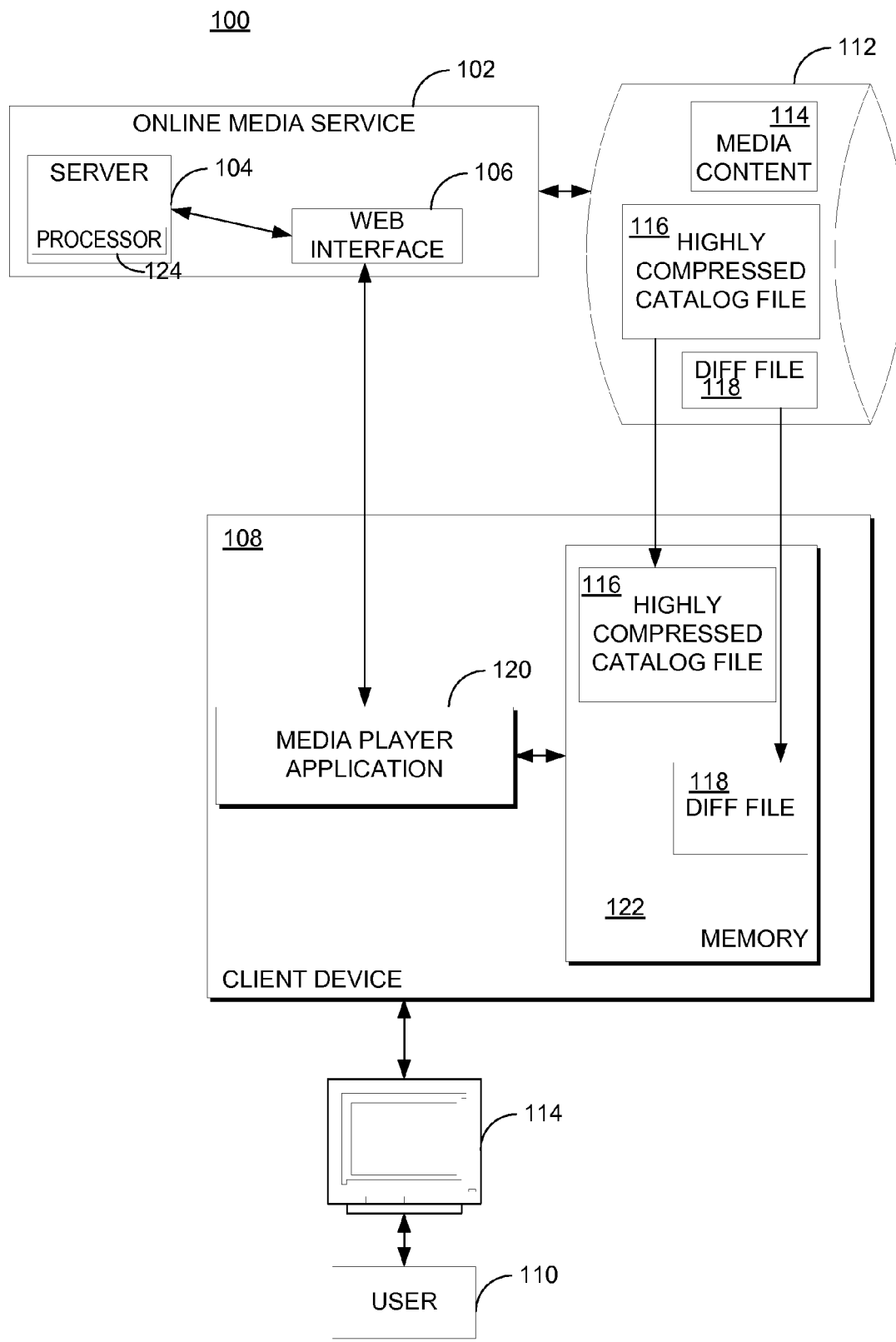
FIG. 1 is a block diagram illustrating a suitable system for creating a highly compressed media catalog file for a user at a client device according to an embodiment of the invention.

Table 1 an implementation of programming code for constructing a highly compressed catalog file according to an embodiment of the invention.

Appendix A illustrates exemplary implementations of constructing one or more data fields referencing various characteristics of the media content according to an embodiment of the invention.

Corresponding reference characters indicate corresponding parts throughout the drawings.

DETAILED DESCRIPTION

Embodiments of the invention enhance users or consumers' experience in using media player program and in purchasing media content by optimizing media cataloging. Referring now to FIG. 1, a block diagram illustrates a suitable system 100 for creating a highly compressed media catalog file for a user 110 at a client device 108 according to an embodiment of the invention. For example, the system 100 includes an online media service 102 which provides a collection of media offerings. In this example, the system 100 may include a server computer 104 for hosting a web interface 106, such as a web site, and a client device 108 through which a user 110 accesses the web interface 106.

In one embodiment, server computer 104 (and the client device 108) comprises a general purpose computing device having one or more processors or processing units 124 and an internal memory area (not shown). As known to those skilled in the art, the general purpose computing device may further include a system bus coupled to additional system components, such as peripheral component interfaces, and at least some form of computer readable media, which include both volatile and nonvolatile media, removable and non-removable media.

For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the general purpose computer (e.g., server computer 104 or client device 108). Also, the system 100 may include communication media, which typically embody computer readable instructions, data structures, program modules, or other data in a modulated data signal such as a carrier wave or other transport mechanism and include any information delivery media. Those skilled in the art who are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In one example, the system 100 may be a distributed network environment in which one or more server computers, such as server computer 104, handles and manages interactions between the web interface 106 and one or more client devices, (e.g., the client device 108). In addition, the server computer 104 is coupled to or has accesses to a data store 112 for storing at least a collection of media content 114, a highly compressed catalog file 116, and a difference (DIFF) file 118. In another example, the online media service 102 provides a service such as sales of media content or files over a common communications network, such as the Internet.

In another example, the client device 108 includes at least a media player application (MPA) 120 for rendering or executing media content or files. In this example, the MPA 120 may render one or more media files, which may include an image file, an audio file, a video file, an audio/video data stream, or the like. The media files or content may be in various known formats such as Moving Picture Experts Group audio layer-3 (MP3), CDA, wave format, midi format, Moving Picture Experts Group audio layer-4 (MP4), Windows Media Audio, Windows Media Video, or other proprietary formats. In another embodiment, the MPA 104 may be any suitable rendering program that is configured to play digital media so that a user can experience the content embodied on the media either audibly or visually (through a display 114) or both. For example, a suitable MPA 120 includes a CD media player application, a digitally-compressed-file player application, a DVD media player application, an image rendering application, and/or a motion picture file rendering application. Executing MPA 120 in the illustrated embodiment enables the user 110 to access one or more digital media files for purchase on a computer-readable medium at the data store 112.

In one embodiment, the computing device 108 may be a portable media player (such as a (MP3) player), a cellular phone, a smartphone, a personal digital assistant (PDA), and/or other digital media rendering device. The client device also includes a processor (not shown) for executing computer-executable instructions, routines, codes, applications, such as MPA 120, and the like.

In another embodiment, the media player application 108 also provides components or modules for rendering hypertext files, such as a web page, with links identifying content located locally or remotely from the client device 108.

Initially, the user 110 launches the MPA 120 from the client device 108 to proceed with a purchase of media content over the Internet. For example, the user 108 may use via an input device (e.g., a mouse or a keyboard) to select an "Online Store" option or tab on the MPA 120 GUI to access the web interface 106. If it is the first time the user 110 visits the online media service 102, the user 110 may be prompted to begin downloading or transferring a highly compressed catalog file 116 from the online media service 102 to the client device 108. If it is not the first time and there is already a copy of the highly compressed catalog file 116 available in the client device 120, the system 100 would determine which version the catalog file 116 before transmitting a DIFF file to the client device 120. The highly compressed catalog file 116 includes a list referencing all media content available for purchase.

Unlike the current practice of storing such catalog file on a server that hosts such online service, embodiments of the invention transfer this catalog file from a server to a client device in which the MPA 120 is executing so that users can conduct fast and convenient querying of the media offerings.

In addition, the media content or media files typically include information relating to the characteristics of the media content. For example, the media content characteristics information may include the title of a musical track or album, the length of playback the media content, the genre of the media content, the recording information of the media content, or the like. In the instance of a still image or a video stream, the characteristics may include aspect ratio, camera angles, decoding scheme, photo resolution, and other types of characteristics information associated with the media content. Other types of characteristics information either in the form of data or metadata associated with the media content may be retrieved from the media content without departing from the scope of the invention.

Referring now to FIG. 2, a diagram illustrates a description of a structure 200 of the highly compressed media catalog file 116 ("hereinafter catalog file 116") according to an embodiment of the invention. In this example, the structure 200 may include a data field for including a file signature 202 (i.e., "MP-CP-Catalog") for the name of the catalog file 116. In one embodiment, the structure 200 also includes a header field 204 which includes header information associated with the catalog file. In addition, the structure 200 includes one or more data fields 206 including data associated with characteristics of the content of the media files. For example, for each track in the collection of the media offering, the data fields 206 include an "all tracks" data field, and the "all tracks" data field include at least a location marker or pointer, wherein each marker identifies a location a word in an array (to be discussed below) used as part of track title. In an alternative embodiment, the location marker or pointer may identify another location marker or pointer. Table 1 illustrates an implementation of programming code for constructing a highly compressed catalog file according to an embodiment of the invention.

TABLE 1

```
#define MAX_STRING_REF        0x00FFFFFF     // 24 bit string references
#define MAX_TRACKARTIST_REF    0x007FFFFF     // 23 bit track artist references
#define MAX_SIMILARARTIST_REF  0x00FFFFFF     // 24 bit string references
#define MAX_SUBGENRE_REF       0x0000FFFF     // 16 bit subgenre references
//*********************************************************************

// File Header Information . . .
//*********************************************************************
```

TABLE 1-continued

```
extern const char___declspec(selectany)  g__szCatalogSignature[ ]  = "WMP-CP-Catalog\n";
extern const char___declspec(selectany)  g__szDiffSignature[ ]     = "WMP-CP-Diff\n";
#define INTERNAL__CATALOG__VERSION            100       // current major version
#define INTERNAL__CATALOG__VERSION__MINOR     101       // current minor version
#define INTERNAL__DIFF__VERSION               100       // current major version
#define INTERNAL__DIFF__VERSION__MINOR        100       // current minor version
struct SCatalogHeader
{
   // V100+
   DWORD dwSize;                         // size of this struct (must be first)
   DWORD dwInternalCatalogVersion;       // INTERNAL__CATALOG__VERSION when this was built
   DWORD dwInternalMinorVersion;         // INTERNAL__CATALOG__VERSION__MINOR when this was built
   DWORD dwFileVersion;                  // file version specified at compilation time
   LCID lcid;                            // lcid of the catalog specified at compilation time
};
struct SDiffHeader
{
   // V100+
   DWORD dwSize;                         // size of this struct (must be first)
   DWORD dwInternalDiffVersion;          // INTERNAL__DIFF__VERSION when this was built
   DWORD dwInternalMinorVersion;         // INTERNAL__DIFF__VERSION__MINOR when this was built
   DWORD dwSourceVersion;                // file version that this patch was meant to patch
   DWORD dwDestinationVersion;           // resultant file version that this patch should end up with
   DWORD dwTextReferenceDepthCount;      // Offsets in the new file for pointer arithmetic
   DWORD dwTextReferenceReservedSize;    // ...
   DWORD dwSimilarArtistReferenceDepthCount;   // ...
   DWORD dwSimilarArtistReferenceReservedSize; // ...
   DWORD dwTrackArtistReferenceDepthCount;     // ...
   DWORD dwTrackArtistReferenceReservedSize;   // ...
   DWORD dwAlbumSubgenreReferenceDepthCount;   // ...
   DWORD dwAlbumSubgenreReferenceReservedSize; // ...
};
```

For example, the data fields 206 may include one or more of the following information: album information of the media files; artist information of the media files, track information of the media files, user behavior information of the media files (e.g., frequency of use), or the like. In one embodiment, sections of the Appendix A illustrate exemplary implementations of constructing the one or more data fields 206 referencing various characteristics, such as artist, track, album, genre (and subgenre), radio station and custom media playlist, of the media content. In another embodiment, the file signature 202, the header field 204, and the one or more data fields 206 may also include metadata associated with the media files. While some of the characteristics information may be intrinsic to media files (e.g., artist or album information), other user-interaction or user behavior information (e.g., frequency of use, favorite ratings, etc.) may be appended to the media files such that these information become part of the characteristics of the media content without departing from the scope of the invention.

The structure 200 also includes an array 208 including all words or reference identifiers identifying only one occurrence of words used in the characteristics of the media content. For example, suppose there are two albums in the catalog file 116: "All that" and "Greatest hits." The "All that" album includes two tracks: "The day before yesterday" and "Memory," and the "Greatest hits" includes three tracks: "1988 and all," "Chicago," and "St. Louis." Given this example, the array 208 would include the following words: "all, that, the, day, before, yesterday, memory, greatest, hits, 1988, Chicago, St. Louis." Although the word "all" has two occurrences, the array 208 would only store one occurrence of the word. In an alternative embodiment, the array 208 is sorted by one or more sorting criteria, such as sorted alphabetically by artist names and then by artist identification numbers. In yet another embodiment, the array 208 includes a delimiting character (e.g., an asterisk (*), a forward slash (/), etc.) for demarking each word in the array.

Figure 3A:
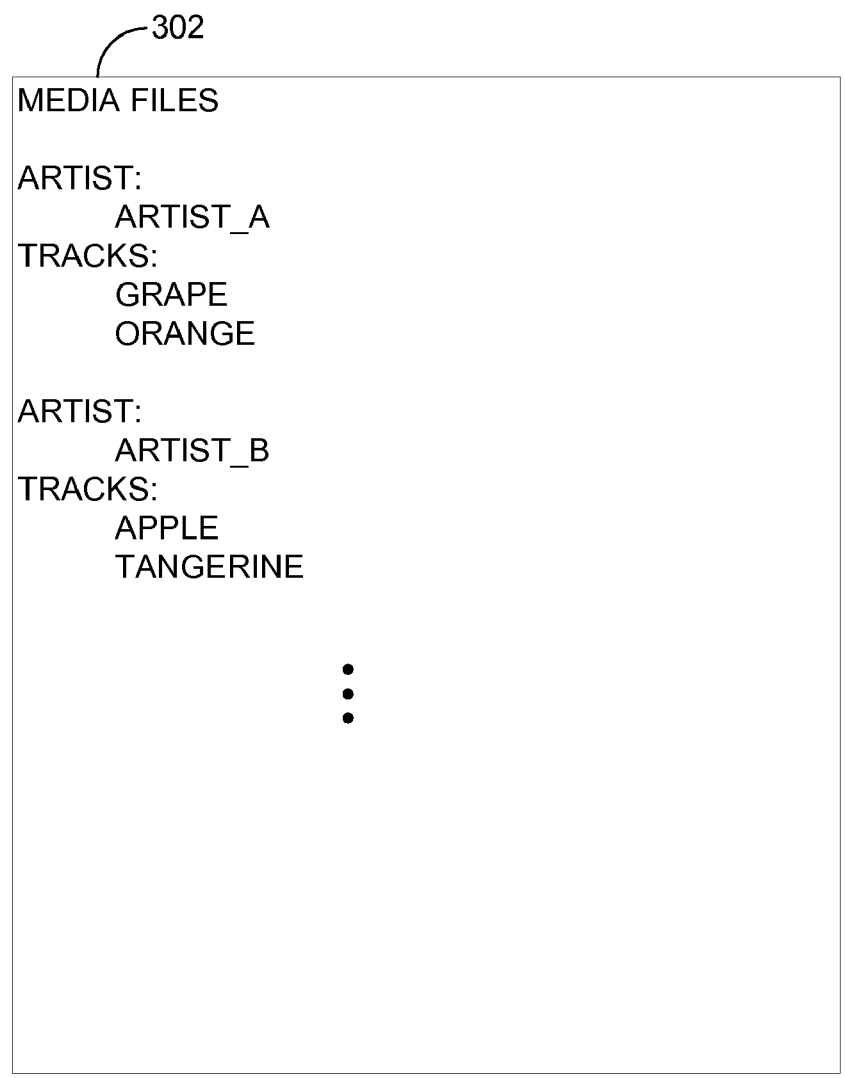
FIG. 3A is a block diagram illustrating a simplified collection of media content to be included in a highly compressed media catalog file according to an embodiment of the invention.

Referring now to FIG. 3A, a block diagram illustrates a simplified example of a collection 302 of media content according to the description of the structure in FIG. 2. In this example, the collection 302 includes information for two musical artists: Artist_A and Artist_B. Artist_A has an unnamed album with two tracks named: "Grape", and "Orange". Artist_B likewise has an unnamed album with two tracks named: "Apple" and "Tangerine". A catalog file (e.g., catalog file 116) representing the information from the collection 302 will be constructed based on the description illustrated in FIG. 2. Using FIG. 3B as an example, a catalog file 304 includes a first data field 306 includes all words associated with the characteristics of the media files referenced in the collection 302 (i.e., Artist_A, Artist_B, Apple, Grape, Orange, and Tangerine). The catalog file 304 also includes one or more second data fields 308 representing characteristics associated with content of media files by including location markers identifying a location of each of the words in the first data field 306. For example, the one or more second data fields 308 includes entries associated with all words included in track titles, while another entries for words used for artists may be organized separately.

In this example, the words in the array 306 are sorted alphabetically first by artist names and second by artist ID. The array 306 also uses an asterisk (*) as a delimiting marker. In another embodiment, the words in the array 306 are sorted according to any other pre-determined or user defined criteria, such as album creation date, a frequency of use, or the like. For example, the description in FIG. 2 illustrates an exemplary sorting criteria. In yet another embodiment, for single-word terms (e.g., artist names, track titles, or the like), the array 306 may include a 3-byte index into this array that points to the beginning of the word that it represents. The array 306 may also include multi-word entries based on the frequency of occurrences of the multi-word combination.

As such, by constructing the catalog file 116 as described above, embodiments of the invention enable an optimized data layout for minimizing the file size of the catalog file 116 as small as possible. This data compression technique is also suitable for the catalog file 116 due to its nature of being updated constantly at different time intervals. Such optimization is desirable due to the constant update nature of the catalog file 116 as new albums are released while other albums are removed due to copyright licensing issues, or the like. For example, new media content becomes available at least every week, sometimes sooner, and contractual issues with content providers keep other media content coming and going in and out of the catalog file 116 on at least a daily basis. As such, aspects of the invention keep the DIFF file during each update as small as possible such that the users may conveniently and efficiently update and search the catalog file 116 locally on the client device 108.

Figure 4A:
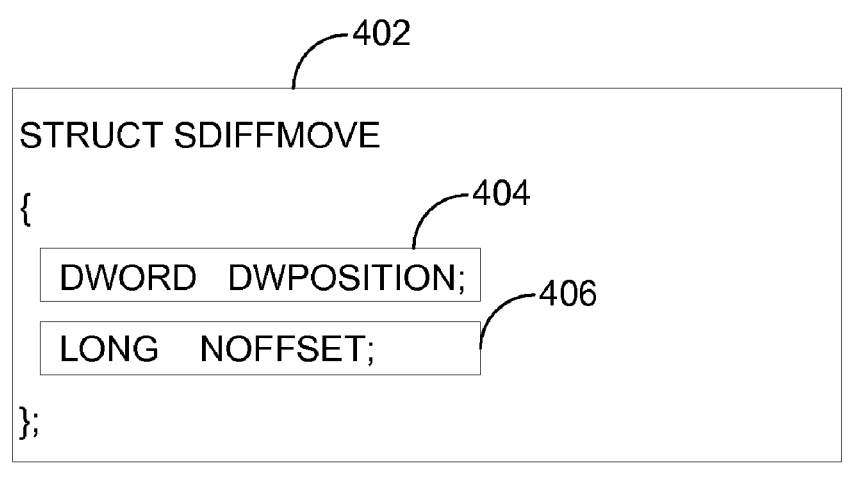

Referring now to FIG. 4A, a diagram illustrates a data structure 402 of a difference (DIFF) file representing an update to the catalog file according to an embodiment of the invention. For example, the DIFF file, such as a DIFF file 118, may be described as follows:

| File Signature | "WMP-CP-Diff" |
|---|---|
| File Header | SDiffHeader |
| All Text Diffs | SDiffMove |
| All Track Diffs | SDiffMove |
| All Aux Stream Diffs | SDiffMove |
| All Text Reference Diffs | SDiffMove |
| All Similar Artist Reference Diffs | SDiffMove |
| All Track Artist Reference Diffs | SDiffMove |
| All Subgenre Reference Diffs | SDiffMove |

Binary Delta Compression section—msdelta.dll generated information, where SDiffMove is represented by the data structure 402.

In this example, a data field 404 (e.g., dwPosition) references an index indicating a position where a difference is identified, and a second data field 406 (e.g., nOffSet) represents the number of character spaces representing the difference.

In one embodiment, the data structure 402 includes a first data field (e.g., data field 404) including data representing a location marker indicating a location of the difference with respect to the first media catalog file. The data structure 402 also includes a second data field including data representing a difference between a first media catalog file and a second media catalog file where applying the difference to the first media catalog file at the indicated location results in the second media catalog file.

Figure 4B:
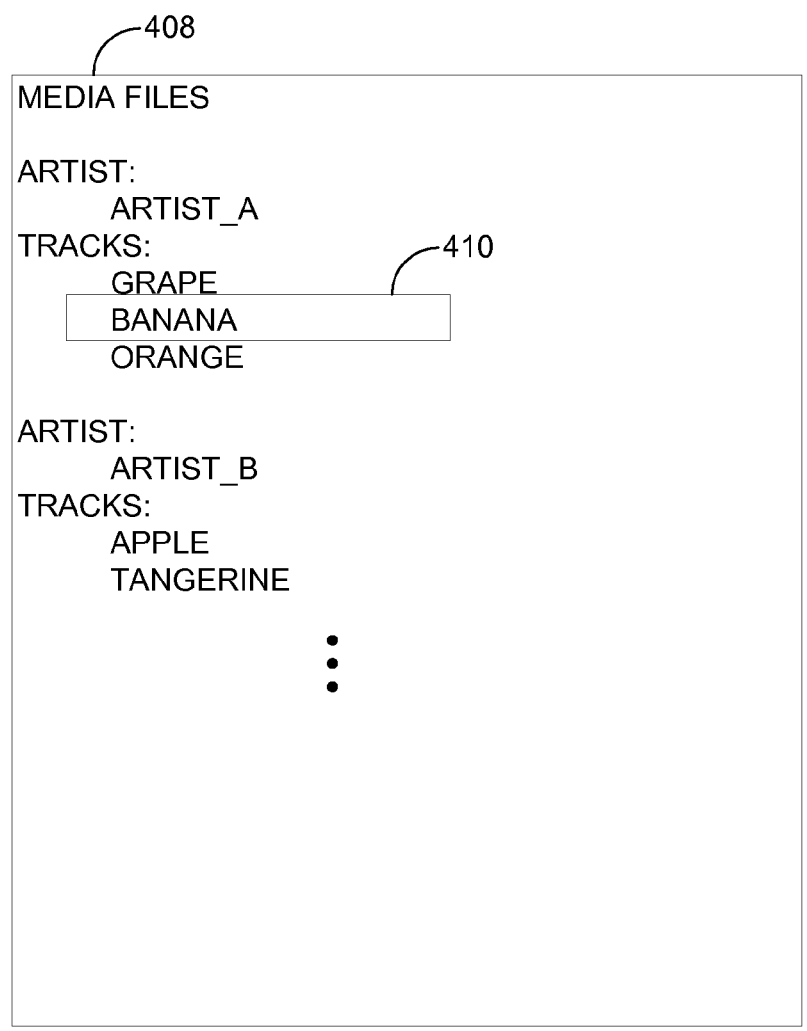
FIG. 4B is a block diagram illustrating another simplified collection of media content showing a difference between its content and the content of the collection of media file shown in FIG. 3A according to an embodiment of the invention.

For example, FIG. 4B is a simplistic example of a second catalog file 402 according to an embodiment of the invention. Suppose a first catalog file (e.g., file 304) was downloaded to the client device 108 the first time, and the second catalog file (e.g., file 410) is an updated catalog file available at the online media service 102. The first catalog file is compared to the second catalog file to identify at least a modified portion in the second catalog file. The modified portion indicates a difference between the content of the first catalog file and the second catalog file. The modified portion in this example is an insertion of a new track titled "Banana" by Artist_A.

Using a new collection showing FIG. 4B as an example, a second catalog file 412 represents a structure of the collection 408, showing a new entry of track title "Banana" (as indicated by a box 410) by Artist_A. With this newly inserted word "Banana," the positions of other existing track titles (e.g., "Grape," "Tangerine") would need to be modified to account for the new insertion. In other words, the values in a second data field 416 would need to be modified.

Existing file comparison techniques would undoubtedly identify the difference, such as the addition of the word "Banana," and the new position markers in the second data field 418. However, because of this addition of the word "Banana" in the middle of the first catalog file, it creates a cascading effect that affects all the remaining entries in the DIFF file.

Figure 4C:
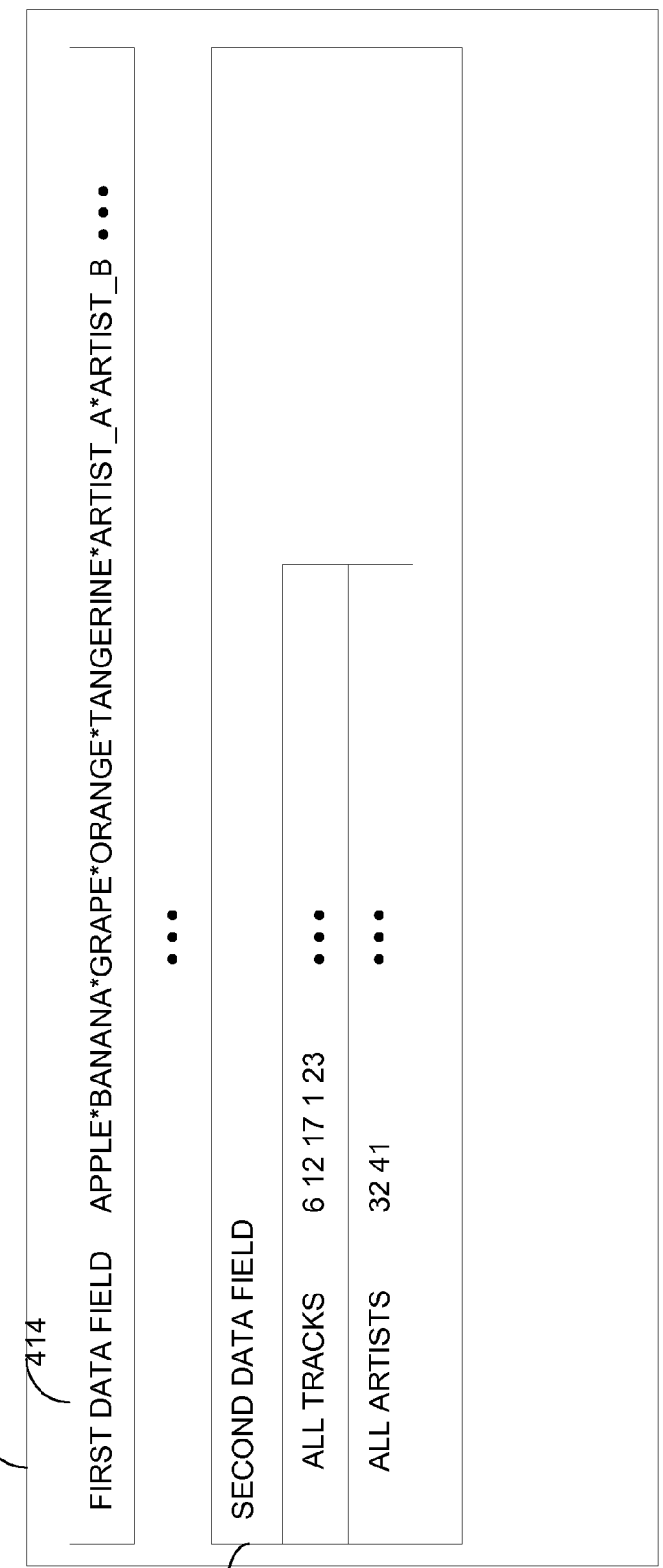
FIG. 4C is a diagram of a simplified example of a highly compressed media catalog file based on the collection in FIG. 4B according to an embodiment of the invention.

Embodiments of the invention use the advantageous data structure of the DIFF file shown in FIG. 4A where it identifies the source of the difference. As such, up to position 6 in the list of tracks, the two catalog files are identical in terms of content in this example. Therefore, in the DIFF file, to account for the difference, a reference marker is assigned to the identified location (e.g., 6) with respect to the second catalog file. FIG. 4D illustrates a DIFF file data structure showing the identified position of the marker and the number of characters that need to be offset according to the example in FIG. 4C.

With this DIFF file, the information in the DIFF file is applied to the first catalog file 402 to create the second catalog file 408 to be used locally for the client device 120, which is an updated version of the first catalog file. In doing so, the reference markers in the DIFF file indicates how many positions the markers need to be adjusted and where the adjustment should begin. In other words, the values for the reference markers or pointers for "Grape", "Orange", and "Tangerine" tracks (6, 12, and 19) would become (6, 19, and 26), where we derived those values by incrementing all pointers over 6 by 7 (as the DiffMove structure instructed). When comparing the old catalog (with modified pointers) to the new catalog, the only difference that normal binary delta compression or other compression technique would identify is the addition of "Banana" to the text stream. The other three differences in track in the first data field are no longer visible. And, the SDiffMove structure facilitates a transformation from a user's old catalog to a new and updated catalog.

In another embodiment, a temporary file is created by applying the reference marker to the first catalog file as a function of the difference, and wherein generating the DIFF file comprises generating the DIFF file by comparing the created temporary file and the second catalog file to indicate the modified portion and indicate the reference marker.

In an alternative embodiment, fields of the structure 200 in FIG. 2 include pointers referring to other parts or fields of the structure 200. For example, words in the artist and album data fields or tables may include pointers referring back to words or items in the track table or data field. The DiffMove structure shown in FIG. 4A applies to pointers the same approach mentioned for strings or words described above. For example, the pointers point to the track table and are modified in the updated catalog based upon the identified differences. For example, a new track at the very beginning of the catalog would make all artist track pointers off by one element. A single DiffMove structure indicating that at position 0, track pointers are offset by 1 would then result in all pointers being aligned again. This same concept is used several places in the catalog from the specific examples used above.

In one embodiment, when the user is viewing a list of files from the online media service 102, the differences may be merged with the older version of the catalog file in the background automatically. In an alternative embodiment, the user's experience is not interrupted when the new differences are merged into their existing catalog. If there is new data, the user may see the new data, but the old data the user was examining (or playing back) would ideally remain the same. For example, embodiments of the invention refresh the current view that the user is looking at automatically as long as possible while not interrupting the user's experience.

In yet another embodiment, the catalog file 116 is sorted to enable a fast identification of differences and apply the difference to the existing catalog file. For example, if tracks were not in a stable sort order in the catalog, adding a few tracks to the catalog (or other minor changes to the catalog) would permit other tracks or information to be modified through sorting.

As such, embodiments of the invention order the listing of the initial/first catalog file with different levels or sorting criteria. For example, the list of track title entries may be ordered as follows:

Artist name;
Artist ID;
Album release date;
Album name;
Album ID; and
Track Number.

In one embodiment, the sorting criteria include the Artist ID which allows for duplicate artist names to be in a stable order, and Album ID allows for duplicate album names (this happens frequently with explicit albums versus edited albums) to be sorted consistently followed by the sorting of Track Number. In this example, track numbers are not duplicated in the catalog. In an alternative embodiment, if duplicate track numbers were allowed, a set of sorting criteria implements Track ID and sort the Track Number followed by Track ID.

In yet another embodiment, aspects of the invention provide a stable sorting order for those elements where there is normally not a stable sorting order. For example, multi-word strings may be sorted by themselves. Suppose there are 500 instances of the word combination "is the" and 500 instances of the word combination "the boat", and a single link/marker points to this combination of two words. Without consistently identifying this combination, the process of identifying the difference and merging the difference would consistently be flipping the reference markers/pointers of the 1000 tracks that point to these combinations. Instead, sorting according to these combinations would require setting priorities among the various sorting criteria. This would allow always choosing "is the" over "the boat" when the equality is spotted.

Figure 5:
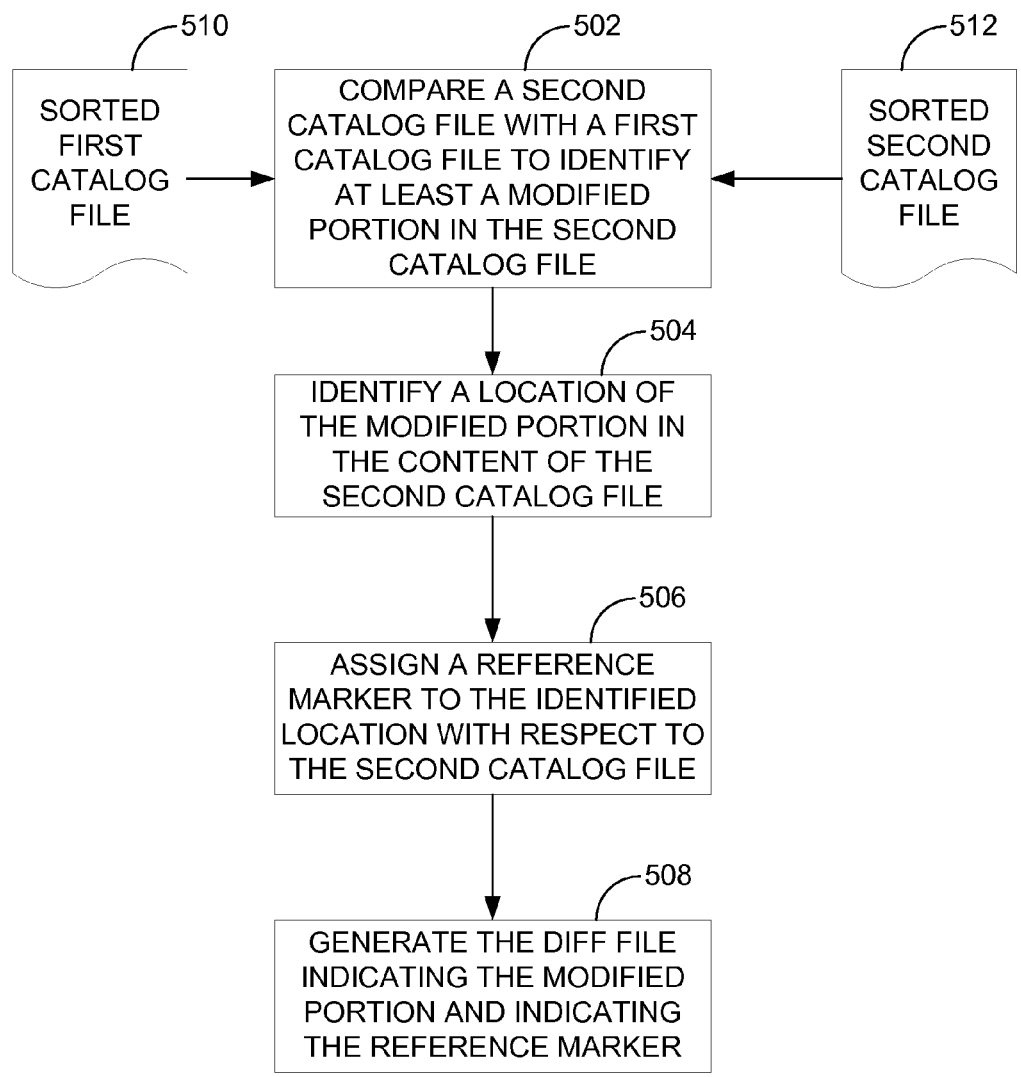
FIG. 5 is flow chart illustrating operation of generating a difference file for catalog files according to an embodiment of the invention.

Referring now to FIG. 5, a flow chart illustrates operation of generating a difference file for catalog files according to an embodiment of the invention. Initially, a first catalog file 510 and a second catalog file 512 are two different catalog files including references to different media offerings. At 502, the first catalog file 510 is compared to the second catalog file 512 to identify at least a modified portion in the second catalog file 512. In one embodiment, the second catalog file 512 represents an updated version of the first catalog file 510. At 504, a location of the modified portion in content of the second catalog file 512 is identified. A reference marker or pointer is assigned to the identified marker or pointer with respect to the second catalog file at 506. At 508, a DIFF file is generated indicating the modified portion and indicating the reference marker. In one embodiment, a temporary file is created by applying the reference marker to the first catalog file as a function of the difference before the DIFF file is generated. In this embodiment, the DIFF is generated by comparing the created temporary file and the second catalog file to indicate the modified portion and indicate the reference marker.

In operation, embodiments of the invention may be implemented as described below. Initially, a first catalog file including an old version of a collection of media offerings is being updated by a second catalog file including a new version of the collection of media offerings. Embodiments of the invention compare the second catalog file with the first catalog file to identify the difference between the two catalog files. In one example, the difference includes at least the locations of the changes or modifications with respect to the first catalog file.

Based on the information on the locations of the changes or modifications with respect to the first catalog file, a temporary file is created by applying the location differences to the first catalog file such that the location index or pointers or reference markers of the temporary file correspond to that of the second catalog file. In other words, this temporary file would only include the actual content difference between the content of the first catalog file and the second catalog file. The temporary file would inherit the old content from the first catalog file while having the pointers or reference markers pointing to the new content from the second catalog file.

With the temporary file, alternative embodiments of the invention compare the content of the temporary file with the content of the second catalog file using the binary delta compression and rapidly and efficiently generate a DIFF file with the difference of the content and the locations of the difference.

On the client device 108 where the MPA 120 receives the DIFF file, embodiments of the invention perform a similar operation to create an updated media catalog file. For example, the MPA 120 first receives the first media catalog file and first media catalog file includes a first index having one or more reference indices. The MPA 120 next receives the DIFF file, and the DIFF file includes a reference marker indicating a location, with respect to the first media catalog file, of a difference between the first media catalog file and the updated media catalog. The DIFF file also includes the difference between the first media catalog file and the updated media catalog file. The MPA 120 maps the reference marker to the first index. The first index is modified as a function of the mapping such that the first index realigns the reference indices according to the reference marker of the DIFF file; and the updated media catalog file is created by applying the difference to the first media catalog to the indicated location. In another embodiment, other software components or application components may perform the operations of mapping or other functions.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Section 1: an exemplary programming implementation of constructing a data structure for each track from a collection of media content tracks to be included in the highly compressed catalog file:

```
struct STrackData
{
   unsigned  nStringLink      : 24;   // Track Title
   unsigned  nDuration        :  8;   // # of seconds from min / avg //32
   unsigned  nDurationMod     :  2;   // Modifiers on nDuration to
                                         allow larger values
   unsigned  nStarRating      :  5;   // Star Rating (64 values)
   unsigned  fHasVideo        :  1;   // Does this track have
                                         a video?
};
const DWORD kTrackDataSize = 5;
```

Section 2: an exemplary programming implementation of constructing a data structure for each artist from a collection of media content artists to be included in the highly compressed catalog file:

```
struct SArtistData
{
   unsigned  nStringLink       : 24;  // Artist Name
   unsigned  nGenre            :  6;  // Primary Artist Genre
                                         (index into Genre Table)
   unsigned  fFeedsAvailable   :  1;  // Feeds Available?
   unsigned  fUnused           :  1;  //32
   unsigned  nArtistID         : 32;  // Artist Service ID    //32
   unsigned  nPopularity       :  8;  // 256 possible values
                                         for popularity
   unsigned  nTrackIndex       : 24;  // 16 Million Track Max
                                         (index of the first artist
                                         track in our catalog)   //32
   unsigned  nSimilarArtistsLink : 24;  // link to similar artists
};
const DWORD kArtistDataSize = 15;
```

Section 3: an exemplary programming implementation of constructing a data structure for each album from a collection of media content albums to be included in the compressed catalog file:

```
struct SAlbumData
{
   unsigned  nStringLink      : 24;   // Album Name
   unsigned  nReleaseDate     :  8;   // 3-month accuracy (1980-2012), 1-year accuracy
                                         (1900-2028)   //32
   unsigned  nAlbumID         : 32;   // Album Service ID   //32
   unsigned  nTrackID         : 32;   // Track Service ID of the first Album Track //32
   unsigned  nSubgenresLink   : 16;   // Link to the list of subgenres for this album
   unsigned  nEditorialGlyph  :  3;   // 0 = no glyph, 1..7 = individual decorative images
   unsigned  nAlbumPrice      :  9;   // 0 = Cannot Buy, 1 = Free, 2 = Unknown, 3 to 511 =
                                         individual prices
   unsigned  nParentalRating  :  2;   // Default parental rating for all tracks in this album
                                         (0 = Unknown, 1 = Dirty, 2 = Clean)
   unsigned  fCanStream       :  1;   // Default rights for all tracks in this album
   unsigned  fCanDownload     :  1;   // Default . . . //32
   unsigned  fCanPreview      :  1;   // Default . . .
   unsigned  fAuxTrackArtists :  1;   // Do we have track artists in the Aux Stream?
   unsigned  fAuxRightsRating :  1;   // Do we have per-track rights (or parental rating)
                                         differences in the Aux Stream?
   unsigned  fAuxTrackNumGaps :  1;   // Do we have gaps in the track numbers?
   unsigned  fAuxTrackIDGaps  :  1;   // Do we have gaps in the track IDs?
   unsigned  nAuxTrackPrice   :  2;   // 0 = all main price, 1 = all secondary price, 2 = all
                                         Aux Stream price, 3 = variaible AuxStream price
   unsigned  fFeedsAvailable  :  1;   // Feeds Available?
   unsigned  nAuxData         : 24;   // Offset into an AuxData stream //32
   unsigned  nTrackIndex      : 24;   // 16 Million Track Max (index of the first album
                                         track in our catalog)
   unsigned  nGenre           :  6;   // Primary Album Genre (index into Genre Table) -
                                         (also indicates presence of composer in AuxData)
   unsigned  fFeatured        :  1;   // Is this album being featured?
   unsigned  fRecentlyAdded   :  1;   // Has this album been recently added? //32
   unsigned  nPopularity      :  8;   // 256 possible values for popularity
};
const DWORD kAlbumDataSize = 25;
#define PARENTAL_RATING_NORMAL 0
#define PARENTAL_RATING_CLEAN  1
```

-continued

```
#define PARENTAL_RATING_DIRTY  2
#define PRICE_CANNOTBUY        0
#define PRICE_FREE             1
#define PRICE_UNKNOWN          2
#define PRICE_MAX              3
#define PRICE_MOSTFREQUENT     (PRICE_MAX)
#define PRICE_MOSTFREQUENT_2   (PRICE_MAX + 2)
#define AUXPRICE_ALLMAIN       0
#define AUXPRICE_ALLSECOND     1
#define AUXPRICE_ALLSAME       2
#define AUXPRICE_VARIABLE      3
// Overflow Data --
// Ordered by basic frequency / compexity of access
// For the ideal album, we don't have to access any of this
//
struct SAuxStreamMarker
{
   unsigned   nTrackCount   : 8;
   unsigned   nStartOffset  : 8;
};
const DWORD kAuxStreamMarkerSize = 2;
struct SAuxTrackArtistLink
{
   unsigned   fAlbumArtist  : 1;
   unsigned   nArtistLink   : 23;
};
const DWORD kAuxTrackArtistLinkSize = 3;
//
// if (fTrackArtists)
// {
//    // SAuxStreamMarker
//    unsigned   nTrackCount   : 8;
//    unsigned   nStartOffset  : 8;
//
//    // nTrackCount of these sequentially
//
//    // SAuxTrackArtistLink
//    unsigned   fAlbumArtist  : 1;   // is the album artist included with this?
//    unsigned   nArtistLink   : 23;
// }
//
struct SAuxTrackGaps
{
   unsigned   fMissing      : 1;
   unsigned   nCount        : 7;
};
const DWORD kAuxTrackGapsSize = 1;
// if (fAuxTrackNumGaps)
// {
//    // nDiscs of these sequentially (for multi-disc sets)
//
//    // SAuxTrackGaps
//    unsigned   fMissing    : 1;
//    unsigned   nCount      : 7;
//
//    // nCount of these sequentially
//
//    BYTE       bTrackNum;
// }
//
// if (nAuxTrackPrice == 2)
// {
//    BYTE       bTrackPrice;
// }
// if (nAuxTrackPrice == 3)
// {
//    // SAuxStreamMarker
//    unsigned   nTrackCount   : 8;
//    unsigned   nStartOffset  : 8;
//
//    // nTrackCount of these sequentially
//
//    BYTE       bTrackPrice;
// }
//
struct SAuxTrackRights
{
   unsigned   fCanStream    : 1;
   unsigned   fCanDownload  : 1;
```

```
    unsigned    fCanPreview   : 1;
    unsigned    nParentalRating : 2;
    unsigned    nUnused       : 3;
};
const DWORD kAuxTrackRightsSize = 1;
//
// if (fAuxRightsRating)
// {
//    // SAuxStreamMarker
//    unsigned   nTrackCount   : 8;
//    unsigned   nStartOffset  : 8;
//
//    // nTrackCount of these sequentially
//
//    // SAuxTrackRights
//    unsigned   fCanStream    : 1;
//    unsigned   fCanDownload  : 1;
//    unsigned   fCanPreview   : 1;
//    unsigned   nParentalRating : 2;
//    unsigned   nUnused       : 3;
// }
//
// if (Genres[nGenre].fTrackComposers)
// {
//    BYTE    bTrackCount;
//
//    // nTrackCount of these sequentially
//
//    unsigned   nStringLink   : 24;    // Composer Name
// }
//
// if ((nTrackGaps == 1) || (nTrackGaps == 3))
// {
//    // SAuxStreamMarker
//    unsigned   nTrackCount   : 8;
//    unsigned   nStartOffset  : 8;
//
//    // nTrackCount of these sequentially
//
//    DWORD      dwTrackID;
// }
```

Section 4: an exemplary programming implementation of constructing a data structure for each genre from a collection of media content genres to be included in the highly compressed catalog file:

```
struct SGenreData
{
    unsigned    nStringLink      : 24;    // Genre Name
    unsigned    fComposer        : 1;     // Show composers
                                          for this genre?
    unsigned    fFeedsAvailable  : 1;     // Are feeds available?
    unsigned    nUnused          : 6;
//32
    unsigned    nGenreID         : 32;    // Genre Service ID
};
const DWORD kGenreDataSize = 8;
struct SSubGenreData
{
    unsigned    nStringLink      : 24;    // SubGenre Name
    unsigned    nParentGenre     : 6;     // Primary Parent
                                          Genre (index into Genre Table)
    unsigned    fFeedsAvailable  : 1;     // Are feeds available?
    unsigned    fUnused          : 1;
//32
    unsigned    nSubGenreID      : 32;    // SubGenre Service ID
//32
    unsigned    nDescriptionLink : 24;    // Description
};
const DWORD kSubGenreDataSize = 11;
```

Section 5: an exemplary programming implementation of constructing a data structure for each custom media playlist from a collection of media content custom media playlists to be included in the highly compressed catalog file:

```
struct SCustomListData
{
    unsigned    nStringLink      : 24;    // List Title
    unsigned    nViewType        : 3;     // (LIST_VIEW_MODE_ICON, etc ...)
    unsigned    nIconSize        : 3;     // (25 .. 200) by increments of 25
    unsigned    fFeatured        : 1;     // Is this list being featured?
    unsigned    fRecentlyAdded   : 1;     // Has this list been recently added?
//32
```

```
                                    -continued
    unsigned   nSubTitleLink    : 24;    // List Subtitle
    unsigned   nPopularity      :  8;    // 256 possible values for popularity
//32
    unsigned   nListItemIndex   : 23;    // 8 Million List Item Max
    unsigned   nListPrice       :  9;    // 0 = Cannot Buy, 1 = Free, 2 = Unknown, 3..511 =
individual prices
//32
    unsigned   nListID          : 32;    // List Service ID
//32
    unsigned   nDescriptionLink : 24;    // List Description
    unsigned   nListType        :  4;    // (LIST_TYPE_TRACK, etc . . .)
    unsigned   nEditorialGlyph  :  3;    // 0 = no glyph, 1..7 = individual decorative images
    unsigned   fNetworkList     :  1;    // the list items are generated via a network call
//32
    unsigned   nGrouping        :  4;    // (LIST_GROUPING_DEFAULT, etc . . .)
    unsigned   nUnused          :  4;
};
const DWORD kCustomListDataSize = 21;
#define LIST_TYPE_TRACK          0
#define LIST_TYPE_LIST           1
#define LIST_TYPE_ARTIST         2
#define LIST_TYPE_ARTISTITEMS    3
#define LIST_TYPE_ALBUM          4
#define LIST_TYPE_ALBUMITEMS     5
#define LIST_TYPE_GENRE          6
#define LIST_TYPE_GENREITEMS     7
#define LIST_TYPE_SUBGENRE       8
#define LIST_TYPE_SUBGENREITEMS  9
#define LIST_TYPE_RADIO         10
#define LIST_VIEW_MODE_ICON      0
#define LIST_VIEW_MODE_TILE      1
#define LIST_VIEW_MODE_REPORT    2
#define LIST_VIEW_MODE_DETAILS   3
#define LIST_VIEW_MODE_ORDEREDLIST 4
#define LIST_VIEW_MODE_NOTSPECIFIED (DWORD)-1
#define LIST_GROUPING_DEFAULT    0
#define LIST_GROUPING_ARTIST     1
#define LIST_GROUPING_ALBUM      2
#define LIST_GROUPING_COMPOSER   3
#define LIST_GROUPING_RATING     4
#define LIST_GROUPING_DATE       5
```

Section 6: an exemplary programming implementation of constructing a data structure for each radio station from a collection of media content radio stations to be included in the highly compressed catalog file:

```
struct SRadioData
{
    unsigned   nStringLink      : 24;    // Radio Station Title
    unsigned   nGenre           :  6;    // Primary Radio Genre (index into Genre Table)
    unsigned   fFeatured        :  1;    // Is this list being featured?
    unsigned   fRecentlyAdded   :  1;    // Has this list been recently added?
//32
    unsigned   nSubTitleLink    : 24;    // Radio Station Subtitle
    unsigned   nPopularity      :  8;    // 256 possible values for popularity
//32
    unsigned   nRadioID         : 32;    // Radio Service ID
//32
    unsigned   nDescriptionLink : 24;    // Radio Station Description
    unsigned   nEditorialGlyph  :  3;    // 0 = no glyph, 1..7 = individual decorative images
    unsigned   fSubscriptionOnly:  1;    // Can you listen only while in subscription mode?
    unsigned   nUnused1         :  4;
//32
    unsigned   nProgrammer      : 24;    // Who programmed the station
    unsigned   nUnused2         :  8;
//32
    unsigned   nMood            : 24;    // Mood of the station
    unsigned   nUnused3         :  8;
//32
    unsigned   nCategory        : 24;    // Category of the station
};
const DWORD kRadioDataSize = 27;
```

What is claimed is:

1. A method for generating from a server a difference (DIFF) catalog file for catalog files, said method comprising:
    generating a first catalog file listing media files without contents of the media files;
    generating a second catalog file, said second catalog file being an updated replacement of the first catalog file including a modified portion of the first catalog file, said modified portion indicating a difference between the content of the first catalog file and the second catalog file, said first catalog file and said second catalog file each including an array with reference identifiers identifying only one occurrence of words used in identifying the media files;
    receiving a request from a client device for identifying one or more of the media files;
    determining whether the client device has previously stored the first catalog file;
    determining that the client device has not previously stored the first catalog file, transmitting the generated second catalog file to the client device;
    determining that the client device has previously stored the first catalog file, comparing the generated second catalog file with the generated first catalog file to identify at least the modified portion in the second catalog file;
    identifying a location of the modified portion in the content of the second catalog file;
    assigning a reference marker to the identified location with respect to the second catalog file;
    generating the DIFF file indicating the modified portion and indicating the reference marker; and
    transmitting the generated DIFF file to the client device to be stored on the client device, wherein the client device executes the generated DIFF file and the first catalog file to generate an identical version of the generated second catalog file such that the second catalog file is stored on the client as a replacement of the first catalog file on the client device.

2. The method of claim 1, further comprising creating a temporary file by applying the reference marker to the first catalog file as a function of the difference, and wherein generating the DIFF file comprises generating the DIFF file by comparing the created temporary file and the second catalog file to indicate the modified portion and indicate the reference marker.

3. The method of claim 1, further calculating an offset value based on the assigned reference marker and the difference.

4. The method of claim 1, wherein the first catalog file and the second catalog file being highly compressed media catalog file.

5. The method of claim 1, further comprising sorting the contents of the first catalog file and the second catalog file and wherein comparing comprises comparing the sorted first catalog file and the sorted second catalog file.

6. The method of claim 1, further comprising generating a reference table including the assigned reference marker with the identified location corresponding to the difference.

7. The method of claim 1, wherein one or more computer storage media have computer-executable instructions for performing the method of claim 1.

8. A system for generating a compressed catalog file, said system comprising:
    an interface for receiving a collection of media offerings from a source;
    a server processor configured to execute computer-executable instructions for:
        generating a second catalog file including an update to a first catalog file including a modified portion of the first catalog file, said modified portion indicating a difference between the content of the first catalog file and the second catalog file, said generated second catalog file including an array with reference identifiers identifying only one occurrence of words used in identifying each of the media offerings in the update, said first catalog file including a previous version of the collection of media offerings;
        comparing the second catalog file with the first catalog file to identify at least the modified portion in the second catalog file, said first catalog file and said second catalog file having references to the collection of media offerings received via the interface;
        identifying a location of the modified portion in the content of the second catalog file;
        assigning a reference marker to the identified location with respect to the second catalog file;
        generating the DIFF file, said generated DIFF file indicating the modified portion and indicating the reference marker;
        receiving a request for the update from a client device, wherein the client device has previously stored the first catalog file on the client device; and
        transmitting the generated DIFF file to the client device, wherein the client device stores the transmitted DIFF file and executes the generated DIFF file and the first catalog file to generate the second catalog file such that the second catalog file is stored as a replacement of the first catalog file on the client device.

9. The system of claim 8, wherein the processor is further configured to create the temporary file by applying the reference marker to the first catalog file as a function of the difference, and the processor generates the DIFF file by comparing the created temporary file and the second catalog file to indicate the modified portion and indicate the reference marker.

10. The system of claim 8, wherein the first catalog file and the second catalog file being highly compressed media catalog file.

11. The system of claim 8, wherein the processor is further configured to sort the contents of the first catalog file and the second catalog file and wherein the processor compares the sorted first catalog file and the sorted second catalog file.

12. The system of claim 11, wherein the processor is configured to sort the contents of the first catalog file and the second catalog file using more than one sorting criteria.

13. The system of claim 8, wherein the processor is further configured to generate a reference table including the assigned reference marker with the identified location corresponding to the difference.

14. One or more computer storage media having stored thereon a data structure for a media catalog file, said media catalog file including references to one or more media files, said data structure comprising:
    a first data field including an array representing a collection of reference identifiers, each of the collection of reference identifiers identifying an occurrence of a word associated with characteristics of the plurality of media files, wherein the first data field comprises another array representing a collection of multi-words, each of the collection of multi-words identifying an occurrence of the word associated with characteristics of the plurality of media files; and
    one or more second data fields including data representing the characteristics associated with content of media files by including location markers identifying a location of each of the words in the first data field, wherein the media catalog file, being delivered for storage on a computing device from a source device remote with respect to the computing device, with the first data field and the one or more second data fields is executed by the computing device to render a list of the one or more media files to a user for interactions.

15. The computer storage media of claim 14, wherein the data structure further comprising a third data field including one or more classifications of the characteristics included in the second data fields.

16. The computer storage media of claim 14, wherein the data structure further comprising a third data field including data representing an identification of the highly compressed media catalog file.

17. The computer storage media of claim 14, wherein the reference identifiers comprise one or more of the following: words, strings of characters, and pointers, and wherein one or more characteristics of content of media files including at least one of the following: artist, track, album, genre (and subgenre), radio station and custom media playlist.

18. The computer storage media of claim 14, wherein the array of the collection of reference identifiers is sorted based on one or more sorting criteria.

19. The computer storage media of claim 14, wherein the another array of the collection of multi-words is sorted based on one or more sorting criteria.

* * * * *